(12) United States Patent
Ching et al.

(10) Patent No.: US 12,315,140 B2
(45) Date of Patent: May 27, 2025

(54) SYSTEM FOR DETECTING HEATER FAILURE BY THERMAL IMAGE

(71) Applicant: Goodrich Corporation, Charlotte, NC (US)

(72) Inventors: Nathaniel Ching, Hartville, OH (US); Galdemir C. Botura, Copley, OH (US); Jin Hu, Cary, NC (US)

(73) Assignee: GOODRICH CORPORATION, Charlotte, NC (US)

( * ) Notice: Subject to any disclaimer, the term of this patent is extended or adjusted under 35 U.S.C. 154(b) by 28 days.

(21) Appl. No.: 18/337,815

(22) Filed: Jun. 20, 2023

(65) Prior Publication Data
US 2024/0428398 A1 Dec. 26, 2024

(51) Int. Cl.
| | |
|---|---|
| G06T 7/00 | (2017.01) |
| B64D 15/12 | (2006.01) |
| B64D 47/08 | (2006.01) |
| B64F 5/60 | (2017.01) |
| G01J 5/00 | (2022.01) |
| G01N 25/72 | (2006.01) |
| H04N 23/23 | (2023.01) |

(52) U.S. Cl.
CPC ............ *G06T 7/001* (2013.01); *G01J 5/0003* (2013.01); *H04N 23/23* (2023.01); *G01J 2005/0077* (2013.01); *G06T 2207/10048* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 2016/0195470 A1* | 7/2016 | Safai ..................... | G01K 11/12 250/206 |
| 2016/0279923 A1 | 9/2016 | Georgeson et al. | |
| 2017/0300847 A1* | 10/2017 | Jones ................ | G06Q 30/0202 |
| 2019/0382139 A1 | 12/2019 | Shi | |
| 2022/0042940 A1* | 2/2022 | Bellucco ............... | G01N 25/72 |
| 2023/0141480 A1* | 5/2023 | Stothers ................ | G01N 27/82 324/654 |

FOREIGN PATENT DOCUMENTS

| | | |
|---|---|---|
| CN | 103448913 A | 12/2013 |
| CN | 106017721 A | 10/2016 |
| CN | 112292909 A | 1/2021 |
| EP | 0459216 A2 * 12/1991 ............ B64D 15/12 |
| EP | 1361089 B1 | 5/2006 |
| WO | 2018215103 A1 | 11/2018 |
| WO | 2020054460 A1 | 3/2020 |

OTHER PUBLICATIONS

Extended European Search Report for EP Application No. 24182600.7, dated Oct. 17, 2024, pp. 1-9.

* cited by examiner

*Primary Examiner* — Hung Q Dang
(74) *Attorney, Agent, or Firm* — CANTOR COLBURN LLP

(57) ABSTRACT

The present disclosure provides for heater failure detection assemblies/systems and related methods of fabrication and use. More particularly, the present disclosure provides for heater failure detection assemblies/systems for aircraft or the like, with the heater failure detection assemblies/systems utilizing thermal images to detect the operation or failure of an aircraft heater.

10 Claims, 6 Drawing Sheets

Amperage Drops to Zero
Temperature Same as Ambient

Temperature Sensor is Affected

SYSTEM FOR DETECTING HEATER FAILURE BY THERMAL IMAGE

TECHNICAL FIELD

The present disclosure relates to heater failure detection assemblies/systems and related methods of fabrication and use and, more particularly, to heater failure detection assemblies/systems for aircraft or the like, with the heater failure detection assemblies/systems utilizing thermal images to detect the operation or failure of an aircraft heater.

BACKGROUND

In general, heaters are used for thermal management of many aircraft parts including ice protection. Most heater assemblies include temperature sensors that can detect the failure of a section of heater. However, many damage-tolerant heaters can suffer local failure in an area of the section that is not near the temperature sensor. Therefore, the local failure can remain undetected by the controller. Adding many different sensors can be a cost and/or manufacturing challenge.

BRIEF DESCRIPTION

The present disclosure provides for heater failure detection assemblies/systems and related methods of fabrication and use. More particularly, the present disclosure provides for heater failure detection assemblies/systems for aircraft or the like, with the heater failure detection assemblies/systems utilizing thermal images to detect the operation or failure of an aircraft heater.

The present disclosure provides for a heater failure detection assembly including at least one camera positioned with respect to a heater of an aircraft component, the at least one camera configured to image and detect abnormal temperature areas of the heater; and wherein images of the abnormal temperature areas from the camera are configured to be compared to a known acceptable image or are configured to be thresholded to show sections of the heater that are above or below pre-determined operational limits to detect the operation or failure of the heater.

In addition to one or more of the features described, or as an alternative to any of the foregoing embodiments, the camera is an infrared camera or a thermal imaging camera, and wherein the heater is an ice protection heater of an aircraft.

In addition to one or more of the features described, or as an alternative to any of the foregoing embodiments, the aircraft component is an engine inlet, a wing or a stabilizer.

In addition to one or more of the features described, or as an alternative to any of the foregoing embodiments, further including a plurality of heaters, the at least one camera positioned with respect to the plurality of heaters of the aircraft component, the at least one camera configured to image and detect abnormal temperature areas of the plurality of heaters.

In addition to one or more of the features described, or as an alternative to any of the foregoing embodiments, wherein the at least one camera is positioned or mounted on a bulkhead or spar behind a protected surface.

In addition to one or more of the features described, or as an alternative to any of the foregoing embodiments, further including a controller, the controller configured to determine if the heater has abnormal temperature areas.

In addition to one or more of the features described, or as an alternative to any of the foregoing embodiments, further including a plurality of cameras positioned with respect to the heater, the plurality of cameras configured to image and detect abnormal temperature areas of the heater.

In addition to one or more of the features described, or as an alternative to any of the foregoing embodiments, further including a controller in communication with the heater failure detection assembly.

In addition to one or more of the features described, or as an alternative to any of the foregoing embodiments, further including a temperature sensor in communication with the heater.

In addition to one or more of the features described, or as an alternative to any of the foregoing embodiments, further including a thermochromic coating associated with the heater to accentuate differences in temperature.

The present disclosure provides for a method for detecting heater failure including positioning at least one camera with respect to a heater of an aircraft component; and imaging and detecting abnormal temperature areas of the heater via the at least one camera; and comparing the images of the abnormal temperature areas to a known acceptable image or thresholding the images of the abnormal temperature areas to show sections of the heater that are above or below pre-determined operational limits to detect the operation or failure of the heater.

In addition to one or more of the features described, or as an alternative to any of the foregoing embodiments, the camera is an infrared camera or a thermal imaging camera, and wherein the heater is an ice protection heater of an aircraft.

In addition to one or more of the features described, or as an alternative to any of the foregoing embodiments, the aircraft component is an engine inlet, a wing or a stabilizer.

In addition to one or more of the features described, or as an alternative to any of the foregoing embodiments, further comprising a plurality of heaters, the at least one camera positioned with respect to the plurality of heaters of the aircraft component, the at least one camera configured to image and detect abnormal temperature areas of the plurality of heaters.

In addition to one or more of the features described, or as an alternative to any of the foregoing embodiments, wherein the at least one camera is positioned or mounted on a bulkhead or spar behind a protected surface.

In addition to one or more of the features described, or as an alternative to any of the foregoing embodiments, further including a controller, the controller configured to determine if the heater has abnormal temperature areas.

In addition to one or more of the features described, or as an alternative to any of the foregoing embodiments, further including a plurality of cameras positioned with respect to the heater, the plurality of cameras configured to image and detect abnormal temperature areas of the heater.

In addition to one or more of the features described, or as an alternative to any of the foregoing embodiments, further including a controller in communication with the heater failure detection assembly.

In addition to one or more of the features described, or as an alternative to any of the foregoing embodiments, further including a temperature sensor in communication with the heater.

In addition to one or more of the features described, or as an alternative to any of the foregoing embodiments, further including a thermochromic coating associated with the heater to accentuate differences in temperature.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
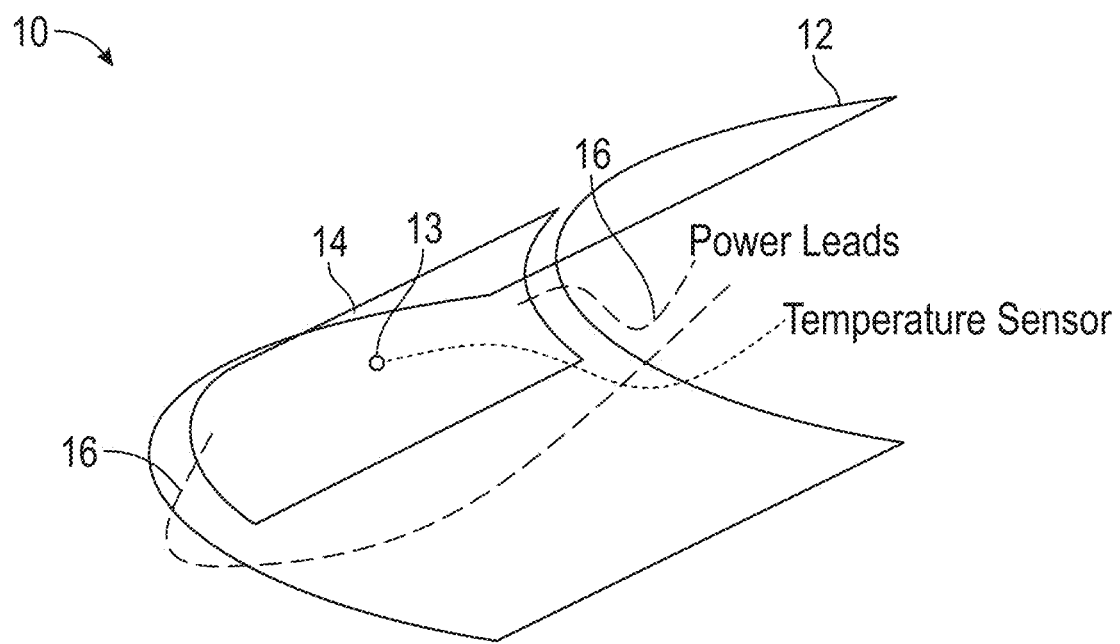
Figure 2A:
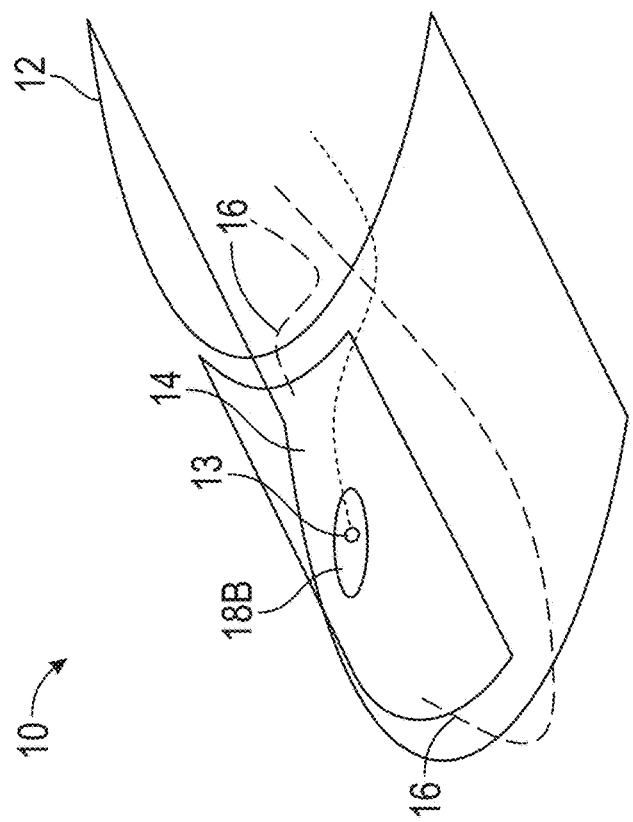
Figure 2B:
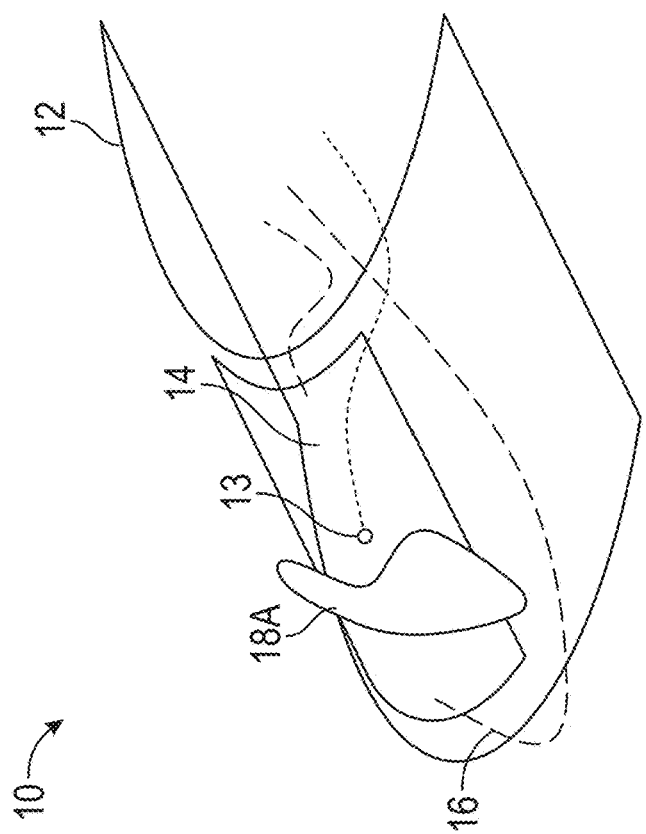
Figure 3:
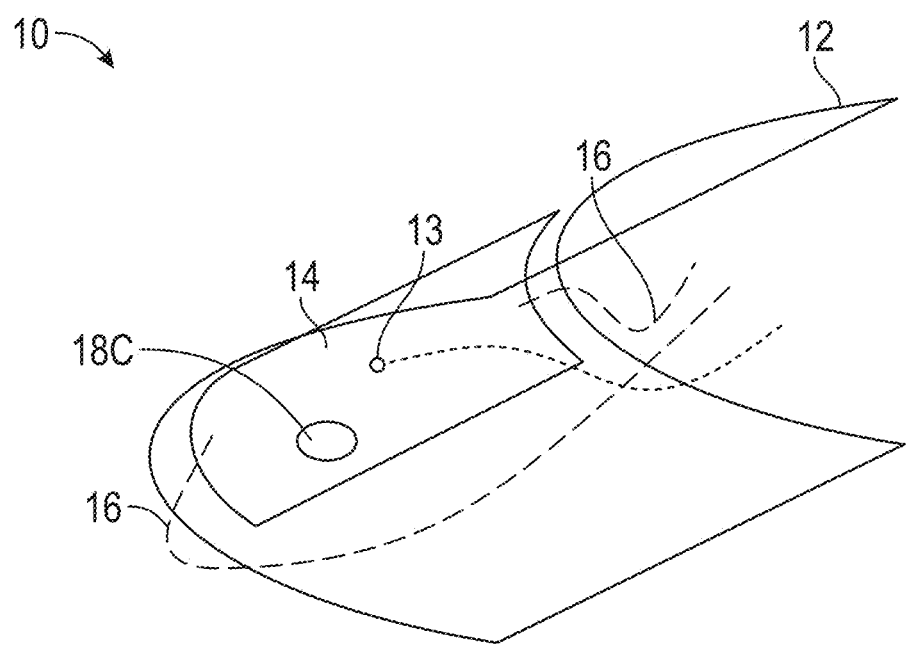
Figure 4:
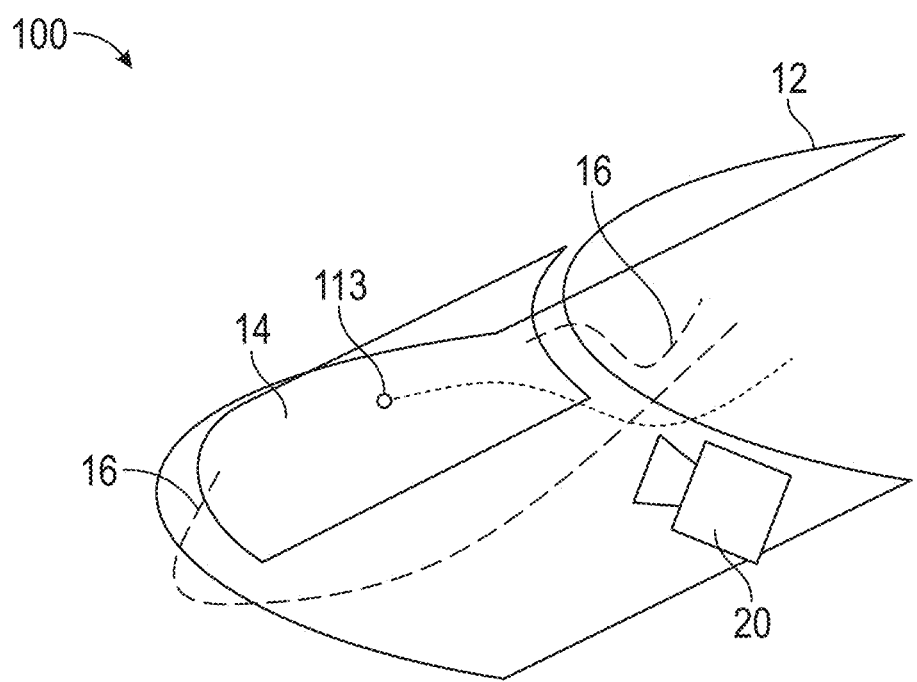
Figure 5:
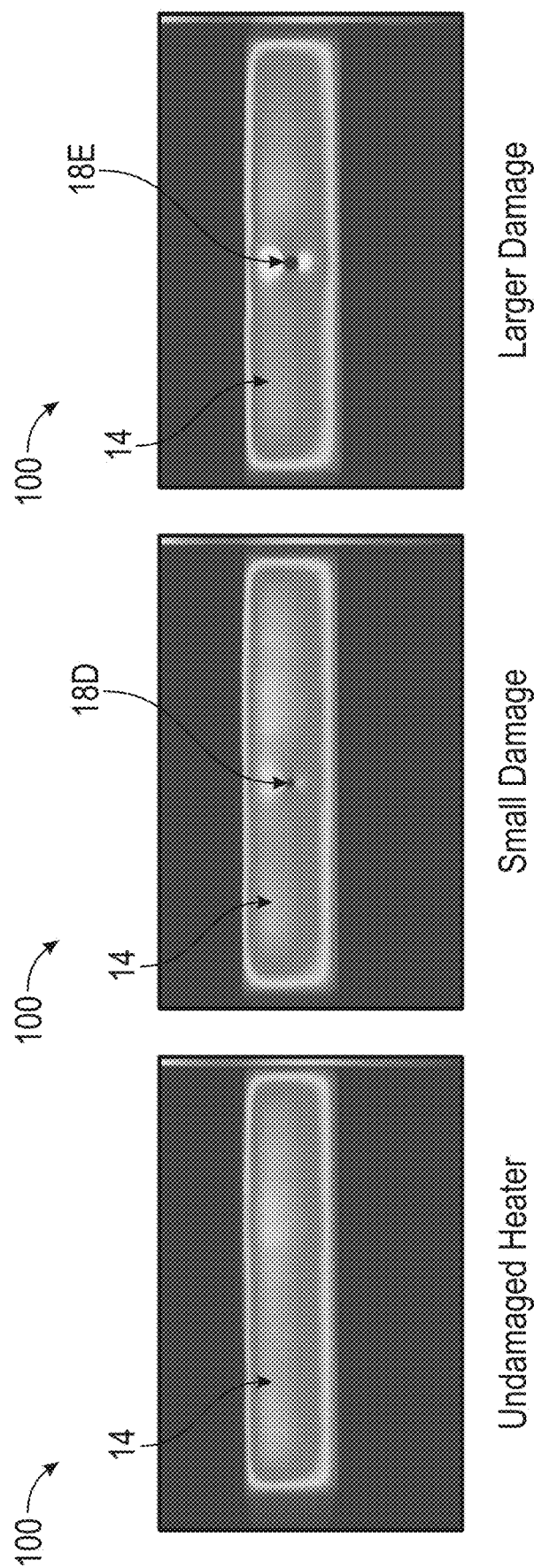
Figure 6:
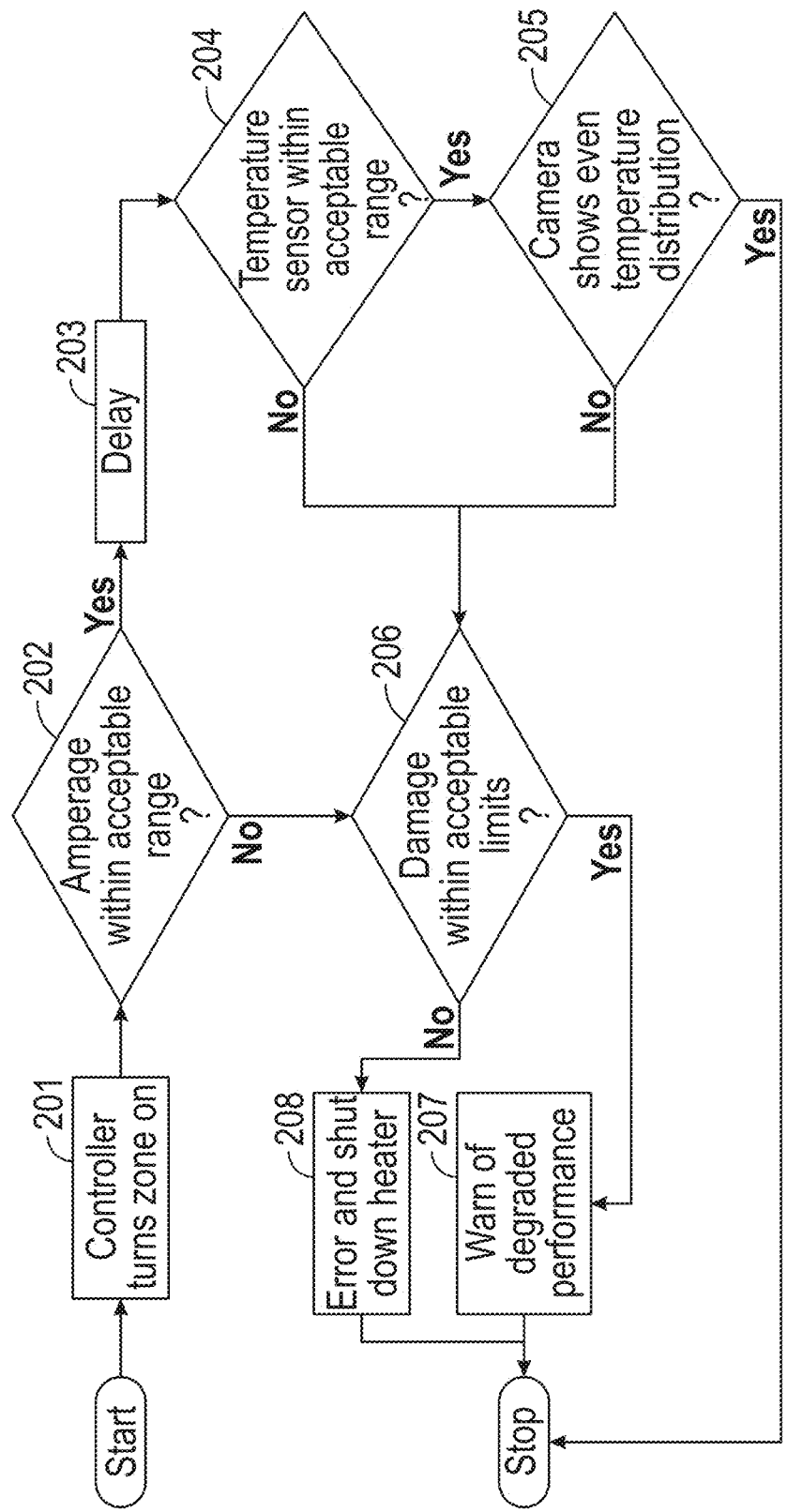

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a side perspective view of an existing heater failure detection system for an aircraft heater;

FIGS. 2A and 2B show side perspective views of the existing heater failure detection system of FIG. 1;

FIG. 3 shows another side perspective view of the existing heater failure detection system of FIG. 1;

FIG. 4 is a side perspective view of an example heater failure detection assembly, according to the present disclosure;

FIGS. 5A-5C depict example infrared images from the example heater failure detection assembly, according to the present disclosure; and FIG. 6 is a schematic showing the basic logic of a controller associated with the example heater failure detection assembly, according to the present disclosure.

DETAILED DESCRIPTION

The example embodiments disclosed herein are illustrative of heater failure detection assemblies for aircraft, and systems of the present disclosure and methods/techniques thereof. It should be understood, however, that the disclosed embodiments are merely examples of the present disclosure, which may be embodied in various forms. Therefore, details disclosed herein with reference to example heater failure detection assemblies and associated processes/techniques of fabrication/assembly and use are not to be interpreted as limiting, but merely as the basis for teaching one skilled in the art how to make and use the systems/assemblies and/or alternative systems/assemblies of the present disclosure.

The present disclosure provides for heater failure detection assemblies/systems and related methods of fabrication and use. More particularly, the present disclosure provides for heater failure detection assemblies/systems for aircraft or the like, with the heater failure detection assemblies/systems utilizing thermal images to detect the operation or failure of an aircraft heater.

FIG. 1 is a side perspective view of an existing heater failure detection system 10 for an aircraft heater 14 associated with an aircraft component 12. As shown in FIG. 1, a temperature sensor 13 is attached to or embedded in the heater 14.

A controller is configured to monitor the temperature sensor 13 and the amperage through the power leads 16. Because the amperage will vary with conditions outside the aircraft, the amperage cannot be used to detect small damage of heater 14.

FIGS. 2A and 2B show side perspective views of the existing heater failure detection system 10 of FIG. 1. As shown in FIGS. 2A and 2B, the temperature sensor 13 of system 10 can detect the damaged areas 18 as specifically illustrated in FIGS. 2A and 2B. For example and as shown in FIG. 2A, with this particular damaged area 18, the amperage drops to zero and the temperature is the same as ambient. As shown in FIG. 2B, the temperature sensor 13 is affected, and the system 10 can detect damaged area 18B.

As shown in FIG. 3, the damaged area 18C may not be detectable by the existing system 10 because the rest of the heater 14 can be mostly unaffected by the damage 18C, so the amperage through the heater 14 and the temperature sensor 13 will be near normal.

In FIG. 3, this area 18C is large enough for ice to form and then potentially break off and damage downstream parts of the aircraft such as the engine or empennage. Additionally, the ice formed on area 18C will increase drag on the aircraft and decrease lift if this is a wing.

FIG. 4 is a side perspective view of an example heater failure detection assembly 100, according to the present disclosure.

In general and as discussed further below, example heater failure detection assembly/system 100 is a detection assembly/system 100 for aircraft or the like, with the heater failure detection assembly/system 100 utilizing thermal images from camera 20 for heater failure detection purposes.

As shown in FIG. 4, a camera (e.g., an infrared camera 20) can be placed at a location where it can image the heater 14 (or a plurality of heaters 14). During operation, the thermal images from the camera 20 can be processed by a controller to determine if the heater 14 has areas with abnormal temperature. Each image from camera 20 can be compared to a known good image, and/or each image from the camera 20 may be thresholded to show sections of the heater 14 that are above or below operational limits. The example camera 20 can be placed at a location where it can image the heater 14; it is noted that multiple cameras 20 can be used if a single camera 20 is impractical. A single camera or array of cameras may be used to monitor multiple heaters. For ice protection applications such as engine inlets, wings, and stabilizers (e.g., aircraft components 12), at least one camera 20 can be placed on a bulkhead or spar behind a protected surface, in example embodiments.

As such and as shown in FIG. 4, in particularly sensitive areas of the aircraft, one or more infrared cameras 20 can monitor most or substantially all areas of the heater 14 to ensure the heater 20 operates properly.

With assembly 100, a temperature sensor 113 can be used to provide precise feedback for the controller, discussed below.

In example embodiments and with assembly 100, the emissivity of the back of the heater 14 should be controlled so that the camera 20 can read an accurate image. It is noted that thermally reflective materials (e.g., aluminum) should not be used.

It is noted that a thermochromic coating can be placed on the surface of heater 14 that is facing camera 20 to accentuate differences in temperature.

FIGS. 5A-5C depict example infrared images from the example heater failure detection assembly 100 of the present disclosure. As shown in FIG. 5A, this image depicts an undamaged heater 14. As shown in FIG. 5B, this image depicts a slightly damaged heater 14 having small damaged area 18D. As shown in FIG. 5C, this image depicts a damaged heater 14 having larger damaged area 18D.

FIG. 6 depicts a schematic of part of the basic logic of a controller of system 100 involving a camera of the present disclosure.

As shown in FIG. 6, in step 201, the controller turns the power, at least one camera 20, and/or sensor 113 of assembly 100 in a particular zone to the on position. In step 202, if the measured amperage of the heater 14 is in an acceptable range, then there is a slight delay at step 203 to allow the heater to warm up. At step 202, if the measured amperage of the heater 14 is not in an acceptable range, then the process skips to step 206, discussed further below.

After the delay at step 203, the system 100 determines if the temperature sensor 113 is within an acceptable range. If yes, the process proceeds to step 205. At step 205, if the camera 20 shows an even temperature distribution, then the process stops as shown in FIG. 6.

If the camera 20 does not show an even temperature distribution at step 205, then the process continues to step 206.

At step 206, the system 100 determines if the damage detected is within acceptable limits. The damage is typically determined by the amount of area of the heater that is not within the correct temperature range. If yes, the system 100 at step 207 can warn a user of degraded performance of heater 14.

If no at step 206, then at step 208 the system 100 registers an error of system 100, and the heater 14 is shut down and prevented from being used again until the system is repaired.

There are many benefits of the assemblies, systems and methods of the present disclosure, including, without limitation, the example thermal camera is more manufacturable than adding a grid of traditional temperature sensors with individual wires to each sensor; and/or the solution of the present disclosure is also more manufacturable than fiber optic sensors because the fiber optic is easy to damage during manufacturing, especially when thermoplastic composite stamping is performed.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. An aircraft system comprising:
   an aircraft component that is an engine inlet, wing or stabilizer;
   a heater, that is an ice protection heater, disposed on the aircraft component, the heater having a zone;
   a temperature sensor coupled to the zone of the heater;
   a heater failure detection assembly comprising at least one camera, that is an infrared or thermal camera, positioned with respect to the heater of the aircraft component,
   a controller operationally coupled to the heater, the temperature sensor and the camera,
   wherein:
   the controller is configured to monitor an amperage of the heater, a temperature measurement of the zone of the heater sensed by the temperature sensor, and images of temperature areas captured by the camera that are indicative of a temperature distribution around the zone; and
   the controller is configured to determine there is damage to the heater when the amperage of the heater and the temperature measurement of the zone of the heater are within an acceptable range and the temperature distribution around the zone is uneven; and
   the controller is configured to compare the images of the temperature areas from the camera to known acceptable images to detect the operational failure of the heater, and thereby detect damage to the heater.

2. The aircraft system of claim 1 further comprising a plurality of heaters, the at least one camera positioned with respect to the plurality of heaters of the aircraft component, the at least one camera configured to image and detect abnormal temperature areas of the plurality of heaters.

3. The aircraft system of claim 1, wherein the at least one camera is positioned or mounted on a bulkhead or spar.

4. The aircraft system of claim 1 further comprising a plurality of cameras positioned with respect to the heater, the plurality of cameras configured to image and detect abnormal temperature areas of the heater.

5. The aircraft system of claim 1 further comprising a thermochromic coating associated with the heater to accentuate differences in temperature.

6. A method for detecting heater failure of a heater attached to a component of an aircraft system, wherein component is an engine inlet, wing or stabilizer, the method comprising:

monitoring, by a controller, an amperage of the heater, a temperature measurement of a zone of the heater sensed by a temperature sensor, and images of temperature areas captured by a camera that are indicative of a temperature distribution around the zone, wherein the camera is an infrared or thermal camera; and determining, by the controller, there is damage to the heater when the amperage of the heater and the temperature measurement of the zone of the heater are within an acceptable range and the temperature distribution around the zone is uneven, wherein the controller compares the images of the temperature areas to known acceptable images to detect the operational failure of the heater, and thereby detect damage to the heater.

7. The method of claim 6 further comprising a plurality of heaters, the at least one camera positioned with respect to the plurality of heaters of the aircraft component, the at least one camera configured to image and detect abnormal temperature areas of the plurality of heaters.

8. The method of claim 6, wherein the at least one camera is positioned or mounted on a bulkhead or spar.

9. The method of claim 6 further comprising a plurality of cameras positioned with respect to the heater, the plurality of cameras configured to image and detect abnormal temperature areas of the heater.

10. The method of claim 6 further comprising a thermochromic coating associated with the heater to accentuate differences in temperature.

\* \* \* \* \*